(12) United States Patent
Khozan et al.

(10) Patent No.: US 7,198,770 B2
(45) Date of Patent: Apr. 3, 2007

(54) PROCESS FOR PRODUCING NICKEL CARBONYL, NICKEL POWDER AND USE THEREOF

(75) Inventors: Kamram M. Khozan, Toronto (CA); Dmitri S. Terekhov, Toronto (CA); Victor Emmanuel Nanthakumar, Toronto (CA); Sergiy Kovtun, Toronto (CA)

(73) Assignee: Chemical Vapour Metal Refining, Inc., Ontario (CA)

( * ) Notice: Subject to any disclaimer, the term of this patent is extended or adjusted under 35 U.S.C. 154(b) by 664 days.

(21) Appl. No.: 10/397,425

(22) Filed: Mar. 27, 2003

(65) Prior Publication Data

US 2004/0109810 A1   Jun. 10, 2004

(51) Int. Cl.
*C01G 53/02* (2006.01)
*C22B 23/02* (2006.01)

(52) U.S. Cl. .......................................... 423/417; 75/629

(58) Field of Classification Search ................ 423/417, 423/150.5; 556/141; 148/234; 75/629–630
See application file for complete search history.

(56) References Cited

U.S. PATENT DOCUMENTS 3,876,415 A * 4/1975 Bell et al. ................. 75/10.67
4,002,463 A * 1/1977 Nestoridis ................. 75/10.67
4,229,213 A * 10/1980 Auck ........................ 423/140

FOREIGN PATENT DOCUMENTS

| GB | 813819 | 5/1959 |
|----|--------|--------|
| GB | 1099464 | 1/1968 |
| GB | 1 401 718 | 7/1975 |
| JP | 56-2136 B | 1/1981 |
| JP | 58-171506 | 10/1983 |

OTHER PUBLICATIONS

Ullmann's Encyclopedia of Industrial Chemistry; Wiley-VCH Verlag GmbH & Co. Nickel: Section 6.3 (Carbonyl Refining); DOI: 10.1002/14356007.a17_157 Article Online Posting Date: Jun. 15, 2000.*

* cited by examiner

*Primary Examiner*—Stuart Hendrickson
(74) *Attorney, Agent, or Firm*—Morgan Lewis & Bockius LLP

(57) ABSTRACT

A process for producing $Ni(CO)_4$ from carbon monoxide and a source of nickel selected from the group consisting of elemental nickel, a nickel compound or mixtures thereof, provided the nickel compound is not nickel chloride per se or in admixture with a nickel carbonate ore, in an amount greater than 50% W/W nickel chloride; which process comprises (a) treating the nickel source with hydrogen at a pressure of at least atmospheric pressure and an effective temperature, in the presence of chloride anion or an in situ generator thereof precursor, to produce a resultant nickel; (b) reacting the carbon monoxide with the resultant nickel to produce the $Ni(CO)_4$; and collecting the $Ni(CO)_4$. The process offers the production of $Ni(CO)_4$ at atmospheric pressure and at a sufficiently high rate for direct use in subsequent deposition processes without the need for storage facilities.

20 Claims, 2 Drawing Sheets

PROCESS FOR PRODUCING NICKEL CARBONYL, NICKEL POWDER AND USE THEREOF

FIELD OF THE INVENTION

This invention relates to processes for producing nickel carbonyl, more particularly to producing nickel powders of use in producing said nickel carbonyl by reaction with carbon monoxide, and to said nickel powders made by said process.

BACKGROUND TO THE INVENTION

Nickel carbonyl, $Ni(CO)_4$ was first produced by the reaction of metallic nickel with carbon monoxide by Mond in the early part of the $19^{th}$ century. Today, one of the major industrial processes for making metallic nickel is based on the production of $Ni(CO)_4$ and subsequent thermal decomposition thereof to Ni and CO. One known commercial process operates at about 180° C. and a CO pressure of about 70 atm. It is known that the CO pressure may be reduced when the reactant nickel is catalytically activated.

Activation of the metal has been observed in the presence of mercury (1, 2), sulfur in the form of $H_2S$ (3, 4), hydrogen (5, 6) or carbon (7). It has been suggested that the high initial rate of formation of $Ni(CO)_4$ and the subsequent decline to a steady state value is the result of a rapid decrease in the number of activated reaction sites which are produced upon heat treatment of the sample (8, 9, 6). A study of surface changes during carbonyl synthesis suggests that the maximum rate is associated with fundamental changes in the defect structure. All of the above methods use catalytical activation of nickel in the presence of CO.

However, it can be readily appreciated that processes that at atmospheric pressure can produce nickel, particularly, activated nickel for subsequent reaction with CO would provide significant capital and operating cost advantages.

Further, it can also be appreciated that processes that enable $Ni(CO)_4$ to be manufactured at a sufficient rate as to obviate the need for storage in order to build up a sufficient supply for practical, efficient use in a subsequent nickel deposition process, would also offer significant capital and operating cost savings. To-date, in commercial operations rate limitations on the production of $Ni(CO)_4$ require such storage facilities and operations.

There is, therefore, a need for an improved method of $Ni(CO)_4$ production which is operably at atmospheric pressure and which is of a sufficient rate as to negate the need for storage of the $Ni(CO)_4$ prior to use in a subsequent deposition process.

PUBLICATIONS

1. Morton J. R., Preston K. F. *J. Chem. Phys.*, 81, 56, (1984).
2. Morton J. R., Preston K. F. *Inorg. Chem.*, 24, 3317, (1985).
3. Mercer D. L.; Inco Ltd. (Can. 1038169 [1975/78]).
4. Schafer H. *Z. Anorg. Allg. Chem.* 493, 17 (1982).
5. Job R. *J. Chem. Educ.* 56, 556 (1979).
6. Mazurek H., Mehta R. S., Dresselhaus M. S., Dresselhaus G., Zeiger H. *J. Surf. Sci.* 118, 530 (1982).
7. Korenev A. V., Shvartsman R. A., Mnukhin A. S., *Tsvetn. Met.* 1979 No11, pp. 37.
8. Mehta R. S., Dresselhaus M. S., Dresselhaus G., Zeiger H. *J. Surf. Sci.* 78, L681 (1978).
9. Greiner G., Manzel D. *J. Catal.* 77 382 (1982).

SUMMARY OF THE INVENTION

It is an object of the present invention to provide a process for the commercial production of $Ni(CO)_4$ from a source of nickel in an efficacious manner at atmospheric pressure, with resultant capital and operation cost savings.

It is a further object of the present invention to provide a process for the commercial continuous production of $Ni(CO)_4$ from a source of nickel at a sufficiently high rate as to negate the need for storage of the $Ni(CO)_4$ prior to a subsequent decomposition step, with resultant capital and operating cost savings.

Accordingly, in one aspect the invention provides a process for producing $Ni(CO)_4$ from carbon monoxide and a source of nickel selected from the group consisting of elemental nickel, a nickel compound or mixtures thereof, provided said nickel compound is not nickel chloride per se or in admixture with a nickel carbonate ore, in an amount greater than 50% W/W nickel chloride; which process comprises (a) treating said nickel source with hydrogen at a pressure of at least atmospheric pressure and an effective temperature, in the presence of chloride anion or an in situ generator thereof precursor, to produce a resultant nickel; and (b) reacting said carbon monoxide with said resultant nickel to produce said $Ni(CO)_4$.

By the term "resultant nickel" as used in this specification and claims is meant resultant particulate nickel that reacts with CO at essentially atmospheric pressure and a temperature of at least 50° C. to effect conversion to $Ni(CO)_4$ at an acceptable conversion rate.

By the term "acceptable conversion rate" is meant herein the rate of production of $Ni(CO)_4$ in the order of at least 0.5 g/hr $Ni(CO)_4$ per g/Ni. A more acceptable rate would be 1 g/hr $Ni(CO)_4$ per g/Ni and a more efficacious rate for direct utilization, without the need for a build-up in storage, in a commercial subsequent deposition process would be at least 10 g/hr $Ni(CO)_4$ per g/Ni.

The effective temperature is a temperature which effects the production of resultant nickel at an acceptable rate at at least atmospheric pressure. Preferably, the effective temperature is in the range 300°–650° C. and more preferably, 350°–550° C.

The $Ni(CO)_4$ produced in step (b) may be collected, or, alternatively, when made at an acceptable conversion rate, preferably of at least 10 g/hr Ni per g Ni, directly passed to a deposition chamber for immediate decomposition to Ni and CO. This enables the CO to be immediately recycled in a closed-loop manner as to provide a continuous CO closed-loop process.

The nickel compounds of use in the practice of the invention as hereinabove defined may readily be selected, from, but not limited to, for example, the group consisting of a nickel salt, carbonate, hydroxide, oxide and metallic elemental nickel. The metallic elemental nickel is most preferably in particulate form, for example, as a very fine powder.

The chloride anion may be selected from, by way of example, but not limited to, hydrogen chloride and a metallic chloride salt, such as, for example, an alkali, alkaline earth or transition metal simple or complex salt, e.g. $FeCl_3$. The invention also includes processes that involve the use of precursors of chloride ion under the reaction conditions defined, such as, for example, suitable use of $Cl_2$, oxides of chlorine gas and $^-OCl_3$ salts that produce chloride anion in situ.

The invention specifically excludes nickel chloride per se alone, and admixtures thereof with nickel carbonate ores containing greater than 50% W/W nickel chloride.

The chloride anion is, preferably, present at a ratio of at least 1:10 atomic W/W % Cl⁻ to Ni, more preferably 1:5 atomic W/W %.

A preferred process is wherein the chloride anion is present as gaseous hydrochloric acid in gaseous admixture with the hydrogen, and more preferably, wherein the nickel compound is first treated with hydrogen at the effective temperature for a first period of time and subsequently treated with the gaseous admixture for a second period of time, at the effective temperature.

The chloride anion in alternative embodiments may be generated in situ under the aforesaid process conditions, according to the invention as defined, in requisite effective amounts from chloride anion generating precursors, such as, for example, chlorate compounds and chlorine gas.

In a further aspect, the invention provides the resultant nickel when made by a process as hereinabove defined prior to its subsequent reaction with CO to from $Ni(Co)_4$.

We have found, further, that relatively small amounts of metal chlorides, e.g. ferric chloride in the presence of non-chloride nickel compounds enable activated nickel to be formed according to the process of the invention hereinabove defined.

The gaseous product stream comprises $H_2$ and HCl and, optionally, $H_2O$, $CO_2$ and CO.

BRIEF DESCRIPTION OF THE DRAWINGS

In order that the invention may be better understood, preferred embodiments will now be described by way of example only with reference to the accompanying drawing, wherein.

DETAILED DESCRIPTION OF PREFERRED EMBODIMENTS

Figure 1:
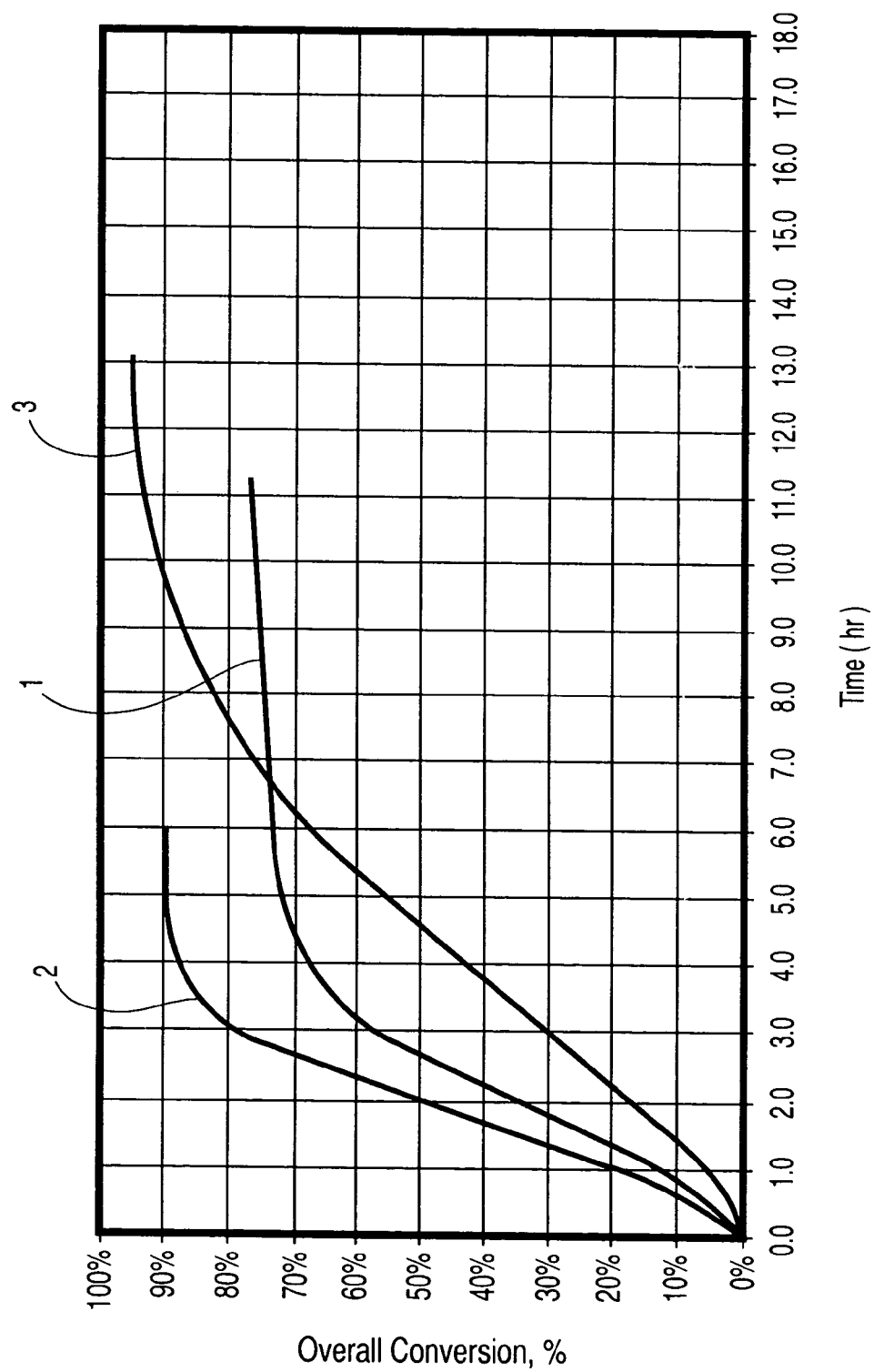
FIG. 1 is a graph showing overall conversion (%) against reaction time (hr.) for various processes according to the invention.

In order that the invention may be better understood, preferred embodiments will now be described by way of example only, wherein Examples 1 and 2 do not constitute part of the invention as claimed but are provided for comparison purposes only.

EXAMPLE 1

PRIOR ART $NiCO_3$ powder (200 g) was placed in an extraction reactor and treated with a stream of $H_2$ gas at 300 mL/min flow rate, at 500° C. for 7 hours to effect substantially complete reduction. The nickel powder produced was cooled to 100° C. and the atmosphere of $H_2$ was subsequently replaced with carbon monoxide. The reactor was cooled further to 50° C. and CO gas passed through at 300 mL/min flow rate. The resulting $Ni(CO)_4$ was passed through a pair of carbonyl decomposers according to the prior art and nickel was recovered as nickel powder, (10 g; 20% yield) after 12 hours.

EXAMPLE 2

PRIOR ART $Ni(OH)_2$ powder (100 g) was placed in the extraction reactor and treated with a stream of $H_2$ gas at 300 mL/min flow, at 500° C. for 7 hours to essentially complete reduction. The resulting nickel powder was cooled to 100° C. in the atmosphere of $H_2$ which was subsequently replaced with carbon monoxide. The reactor was cooled down further to 50° C. and CO gas passed through at 300 mL/min flow rate. The resulting $Ni(CO)_4$ gas was passed through carbonyl decomposers and nickel powder (6 g, 9.5 yield) after 12 hours was recovered.

EXAMPLE 3

300.1 g of a nickel carbonate/nickel chloride mixture (10:1 w/w) was placed into an extraction reactor and treated with hydrogen (2 L/min) at 450° C. for 6 hours. Subsequently, the hydrogen was replaced with argon, the reactor cooled to 40° C. and the argon replaced with carbon monoxide at a gas temperature of 80° C., and flow rate of 4 L/min. whereby nickel carbonyl was formed, collected and subsequently decomposed to Ni and CO to provide (103 g; 70%) yield of nickel extraction yield in 6 hr.

EXAMPLE 4

302.3 g of the same mixture as in Example 3 was treated under similar conditions but wherein after 0.5 h, the hydrogen gas was doped with 1% of HCl for a further reaction period of 4 hours. The subsequent nickel extraction procedure was similar to Example 3 and gave 134 g; 90% yield of nickel in 6 h.

EXAMPLE 5

300.1 g of nickel carbonate was treated under similar conditions as in Example 4 but wherein after 0.5 h a flow of 900 cc/min of HCl gas was introduced into the hydrogen flow at 2 L/min for 4 h. The subsequent nickel extraction procedure was similar to Example 3 and gave a 96.48% yield of nickel in 13 h.

The aforesaid examples 3–5 are better illustrated with reference to FIG. 1 wherein:

Line 1 represents the carbonylation of nickel produced by the reaction of a mixture of nickel carbonate/nickel chloride 10:1. (6 h, 70.4% yield) according to Example 3.

Line 2 represents the same composition according to line 1 plus 1% pf HCl in the gas stream (6 hours, 90.45% yield) according to Example 4; and Line 3 represents 100% nickel carbonate plus HCl (13 h, 96.48%) according to Example 5.

The aforesaid examples clearly illustrate the beneficial effect of having chloride anion present in admixture with a nickel compound in the hydrogen reactor in producing a particulate nickel more efficacious in reacting with CO to produce $Ni(CO)_4$.

TABLE 1

| Example | Ni Compound (g) | Equivalent Ni (g) | Deposited Ni (g) | Time (hr)* | Rate** gNi/gNi/hr (approx.) |
|---|---|---|---|---|---|
| #1 | 200 (NiCO₃) | 49 | 10 | 12 | 0.01 |
| #2 | 100 (Ni(OH)₂)) | 63 | 6 | 12 | 0.01 |
| #3 | 300 NiCO₃/ NiCl₂ (10:1) | 147 | 103 | 6 | 1.17 |
| #4 | 302 NiCO₃/ NiCl₂ (10:1) | 148 | 134 | 6 | 15 |
| #5 | 300 g NiCO₃ | 148 | 142 | 13 | 7.4 |

*carbonylation and subsequent decomposition time from treated (reduced) Ni.
**rate of deposition of Ni metal per se per hour per 1 gm equivalent Ni, calculated from Ni compound starting material.

Table 1 shows the beneficial enhancement in the rate of production of Ni from its various sources by the process according to the present invention, wherein the presence of chloride anion in Examples 3, 4 and 5 shows the very significant beneficial effect over the absence of chloride anion in Examples 1 and 2.

This enhancement in production rate of $Ni(CO)_4$ enables the direct use thereof in any subsequent desired decomposition step.

Figure 2:
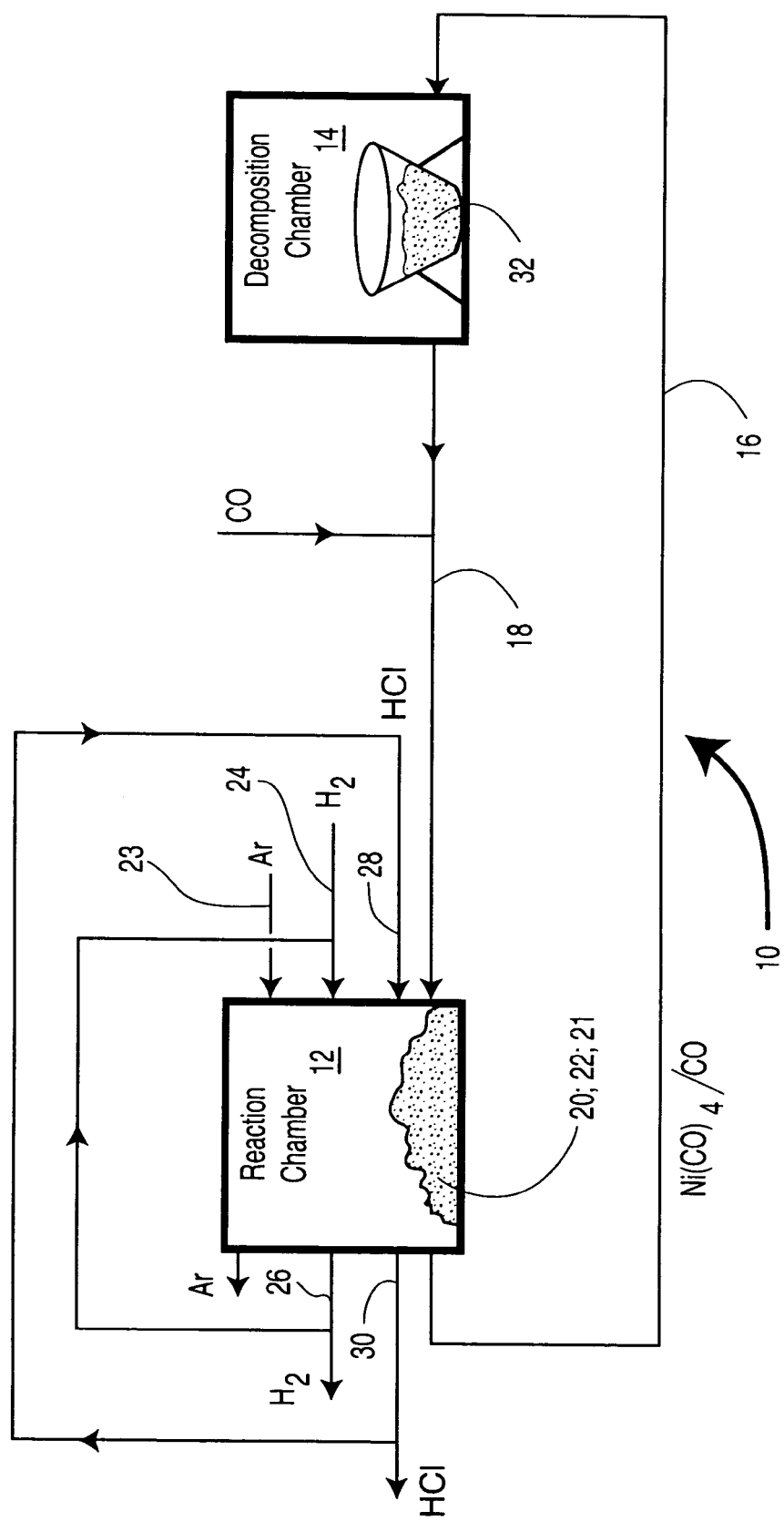
FIG. 2 is a diagrammatic flow diagram of a continuous self-contained process according to the invention.

FIG. 2 is a diagrammatic flow diagram of a continuous nickel deposition process self-contained with respect to CO, according to the invention. It shows generally as 10, a reaction chamber 12 linked to decomposition chamber 14 by $Ni(CO)_4$ and CO conduits 16 and 18, respectively.

Chamber 12 contains, alternatively, nickel source 20 and resultant nickel 22; and has hydrogen feed and outlet/recycle conduits 24 and 26, respectively; HCl feed and outlet/recycle conduits 28 and 30, respectively; and $Ni(CO)_4$/CO exit conduit 16. Decomposition chamber 14 contains a substrate 32 to be coated by $Ni(CO)_4$ from line 16.

In operation, nickel source 20 is treated with hydrogen, typically, at 400–500° C. for 5–15 hours and 2 l/min at atmosphere pressure to produce a reduced nickel powder 21.

HCl gas at 1 l/min and 50–80° is then recycled through chamber 12, optionally, with hydrogen, to produce treated nickel powder 22. Chamber 12 is then subsequently purged with, for example, argon from conduit 23 and, thereafter, CO from conduit 18 is fed into chamber 12, wherein $Ni(CO)_4$ is produced and passed through conduit 16 to decomposition chamber 14. Recycle conduit as shown in FIG. 2 are utilized as desired.

It can be seen that once the process is operating at "steady state" for an alternative two-stage operative cycle, that the amount of CO used in the production of $Ni(CO)_4$ can be met from the decomposition thereof in chamber 14. The process can thus be considered as being essentially self-contained with respect to CO.

Importantly, since the rate of production of $Ni(CO)_4$ in chamber 12 is sufficiently high enough to warrant a direct feed to chamber 14 for decomposition of Ni onto substrate 32 in an efficacious manner, no intervening storage facility is required. This is of value in commercial operations.

Although this disclosure has described and illustrated certain preferred embodiments of the invention, it is to be understood that the invention is not restricted to those particular embodiments. Rather, the invention includes all embodiments which are functional or mechanical equivalents of the specific embodiments and features that have been described and illustrated.

The invention claimed is:

1. A process for producing $Ni(CO)_4$ from carbon monoxide and a source of nickel selected from the group consisting of elemental nickel, a nickel compound or mixtures thereof, provided said nickel compound is not nickel chloride per se or in admixture with a nickel carbonate ore, in an amount greater than 50% W/W nickel chloride; which process comprises (a) treating said nickel source with hydrogen at a pressure of at least atmospheric pressure and an effective temperature, in the presence of chloride anion or an in situ generator thereof precursor; to produce a resultant nickel; and (b) reacting said carbon monoxide with said resultant nickel to produce said $Ni(CO)_4$ wherein said nickel compound is selected from the group consisting of a nickel salt, nickel hydroxide, nickel carbonate and nickel oxide; said chloride anion is present as gaseous hydrochloric acid in gaseous admixture with said hydrogen; and said nickel compound is firstly treated with hydrogen at said effective temperature for a first period of time and subsequently treated with said gaseous admixture for a second period of time, at said effective temperature.

2. A process as defined in claim 1 wherein said nickel compound is nickel carbonate and said gaseous admixture comprises HCl and $H_2$ in the ratio of about 1:2.

3. A process as defined in claim 2 wherein said nickel compound is nickel carbonate.

4. A process for producing $Ni(CO)_4$ from carbon monoxide and a source of nickel selected from the group consisting of elemental nickel, a nickel compound or mixtures thereof, provided said nickel compound is not nickel chloride per se or in admixture with a nickel carbonate ore, in an amount greater than 50% W/W nickel chloride; which process comprises (a) treating said nickel source with hydrogen at a pressure of at least atmospheric pressure and an effective temperature, in the presence of chloride anion or an in situ generator thereof precursor; to produce a resultant nickel; and (b) reacting said carbon monoxide with said resultant nickel to produce said $Ni(CO)_4$ wherein said effective temperature is selected from the range 300°–650° C.

5. A process as defined in claim 4 wherein said chloride anion is present as gaseous hydrochloric acid in gaseous admixture with said hydrogen.

6. A process as defined in claim 4 wherein said chloride anion is present from a compound selected from hydrogen chloride and a metallic chloride.

7. A process as defined in claim 6 wherein said metallic chloride is selected from the group consisting of an alkali, alkaline earth and transition metal chloride.

8. A process as defined in claim 4 wherein said effective temperature is selected from 350°–550° C.

9. A process as defined in claim 4 wherein said precursor is selected from the group consisting of $Cl_2$, oxides of chlorine and NaOCl.

10. A process as defined in claim 1 or claim 4 wherein said resultant nickel is reacted with carbon monoxide at a temperature of at least 50° C.

11. A process as defined in claim 1 or claim 4 wherein said $Ni(CO)_4$ is produced in step (b) at a conversion rate of at least 10 g/hr $Ni(C)O)_4$ per g Ni, and further comprising passing said $Ni(CO)_4$ directly to a decomposition chamber and decomposing said $Ni(CO)_4$ to deposit nickel and CO.

12. A process for producing a resultant treated nickel compound of subsequent use in the production of $Ni(CO)_4$ by reaction with carbon monoxide, from a nickel source selected from the group consisting of elemental nickel, a nickel compound or mixtures thereof, provided said nickel compound is not nickel chloride per se or in admixture with a nickel carbonate ore, in an amount greater than 50% W/W nickel chloride which process comprises (a) treating said nickel source with hydrogen at a pressure of at least atmospheric pressure and an effective temperature, in the presence of chloride anion or an in situ generator thereof precursor; and collecting said resultant nickel wherein said chloride anion is present as gaseous hydrochloric acid in gaseous admixture with said hydrogen and said nickel compound is firstly treated with hydrogen at said effective temperature for a first period of time and subsequently treated with said gaseous admixture for a second period of time, at said effective temperature.

13. A process as defined in claim 12 wherein said nickel compound is nickel carbonate said gaseous admixture comprises HCl and $H_2$ in the ration of about 1:2.

14. A process as defined in claim 13 wherein said nickel compound is nickel carbonate.

15. A process as defined in claim 12 wherein said nickel compound is selected from the group consisting of a nickel salt, nickel hydroxide, nickel carbonate and nickel oxide.

16. A process as defined in claim 12 wherein said chloride anion is present from a compound selected from the group consisting of hydrogen chloride and a metallic chloride.

17. A process as defined in claim 16 wherein said metallic chloride is selected from the group consisting of an alkali, alkaline earth and transition metal chloride.

18. A process as defined in claim 12 wherein said precursor is selected from the group consisting of $Cl_2$ oxides of chlorine and OCl salts.

19. A process for producing a resultant treated nickel compound of subsequent use in the production of $Ni(CO)_4$ by reaction with carbon monoxide, from a nickel source selected from the group consisting of elemental nickel, a nickel compound or mixtures thereof, provided said nickel compound is not nickel chloride per se or in admixture with a nickel carbonate ore, in an amount greater than 50% W/W nickel chloride which process comprises (a) treating said nickel source with hydrogen at a pressure of at least atmospheric pressure and an effective temperature, in the presence of chloride anion or an in situ generator thereof precursor; and collecting said resultant nickel wherein said effective temperature is selected from the range 300°–650° C.

20. A process as defined in claim 19 wherein said effective temperature is selected from 350°–550° C.

* * * * *